United States Patent [19]

Sakaguchi

[11] Patent Number: 5,193,763
[45] Date of Patent: Mar. 16, 1993

[54] TWO-SPEED FISHING REEL WITH AXIALLY MOVABLE CLUTCH

[75] Inventor: Noboru Sakaguchi, Tondabayashi, Japan

[73] Assignee: Shimano, Inc., Osaka, Japan

[21] Appl. No.: 548,584

[22] Filed: Jul. 5, 1990

[30] Foreign Application Priority Data

Jul. 5, 1989 [JP] Japan .............................. 1-79674[U]

[51] Int. Cl.⁵ .......................................... A01K 89/015
[52] U.S. Cl. .................................... 242/255; 242/261; 242/322
[58] Field of Search ............... 242/255, 261, 263, 267, 242/290, 303, 323, 322

[56] References Cited

U.S. PATENT DOCUMENTS

| | | | |
|---|---|---|---|
| 2,130,581 | 9/1938 | Case | 242/261 |
| 2,760,357 | 8/1956 | Burns | 242/260 |
| 3,325,117 | 6/1967 | Hiromitsu | 242/255 |
| 3,499,609 | 3/1970 | Policansky | 242/255 |
| 4,341,366 | 7/1982 | Kawada | 242/261 |
| 4,394,991 | 7/1983 | Noda | 242/261 X |
| 4,512,536 | 4/1985 | Sato | 242/261 |
| 4,579,296 | 4/1986 | Karlsson et al. | 242/261 |
| 4,867,392 | 9/1989 | Sato | 242/255 |
| 4,951,898 | 8/1990 | Sakaguchi | 242/255 |
| 4,951,899 | 8/1990 | Moosberg | 242/255 |

Primary Examiner—Katherine Matecki
Attorney, Agent, or Firm—Dickstein, Shapiro & Morin

[57] ABSTRACT

A fishing reel comprising a reel body, a spool rotatably supported by the reel body through a spool shaft, a handle shaft rotatably supported by the reel body, a first and a second main gears rotatably mounted on the handle shaft, a shifter for selectively transmitting rotation of the handle shaft to the first and second main gears, a first and a second pinion gears rotatably mounted on the spool shaft and constantly meshed with the first and second main gears, respectively, a clutch element disposed between the pinion gears and the spool to be movable axially of the spool shaft to make and break an interlock between rotation of the pinion gears and rotation of the spool, and a clutch lever for operating the clutch element.

2 Claims, 3 Drawing Sheets

TWO-SPEED FISHING REEL WITH AXIALLY MOVABLE CLUTCH

BACKGROUND OF THE INVENTION

1. Field of the Invention

The present invention relates to a fishing reel comprising a reel body, a spool rotatably supported by the reel body through a spool shaft, a handle shaft rotatably supported by the reel body, a first and a second main gears rotatably mounted on the handle shaft, a shifter for transmitting rotation of the handle shaft selectively to one of the first and second main gears, a first and a second pinion gears rotatably mounted on the spool shaft and constantly meshed with the first and second main gears, respectively, a clutch element disposed between the pinion gears and spool for making and breaking torque transmission between the pinion gears and spool, and a clutch lever for operating the clutch element.

2. Description of the Prior Art

In a conventional fishing reel, as disclosed in Japanese Utility Model Publication Kokai No. 63-163165 for example, a drag mechanism is provided between an end of the spool shaft and the spool. The entire spool shaft is axially movable to act as a clutch for breaking an interlock between the pinion gears and the spool.

In a fishing reel having only a pair of a main gear and a pinion gear, as shown in Japanese Utility Model Publication No. 60-13359, a non-circular portion is defined on the spool shaft adjacent the pinion gear, with an engaging tube portion defined integral with the pinion gear for engaging the non-circular portion. The pinion gear is movable axially of the spool shaft whereby the non-circular portion and the engaging tube portion act as a clutch for breaking an interlock between the pinion gear and the spool.

The former known construction has the disadvantage of requiring a large and complicated construction, which is costly, for axially moving the entire spool shaft. In view of the latter known construction, it is conceivable to devise a modification wherein the pinion gears are movably supported on the spool shaft, with the non-circular portion and engaging portion acting as a clutch.

It is an important requirement of a fishing reel that the spool is rotatable at high speed. Thus, it is necessary for the pinion gears to have as high rotating ratios with respect to the main gears as possible, and to have as small diameters as possible. It also is an important requirement to avoid wide variations of the rotating ratios resulting from operation of the shifter. With the small first and second pinion gears having slightly different diameters, the rotating ratios could inadvertently vary to excessive extents. Therefore, the first and second pinion gears are required to have small diameters which are not very different.

However, according to the modification made in view of the latter known construction, the first and second main gears must be separated axially of the spool shaft in order to avoid interference between teeth of the main gears and teeth of the pinion gears when moving the pinion gears axially of the spool shaft. As a result, the reel has increased dimensions axially of the spool shaft, thereby becoming cumbersome to handle.

SUMMARY OF THE INVENTION

An object of the present invention is to provide a fishing reel having a simple and compact construction while allowing the spool to rotate at high speed, with the rotating ratios of the pinion gears with respect to the main gears switchable by a shifter within an appropriate range.

In order to achieve the above object, the present invention is characterized in that the clutch element disposed between the pinion gears and the spool is movable axially of the spool shaft to make and break the interlock between rotation of the pinion gears and rotation of the spool.

According to the present invention, the interlock between rotation of the pinion gears and rotation of the spool may be made or broken only by operating the clutch element and clutch lever, which allows a very simplified construction. The pinion gears need not be moved and the first and second main gears may be disposed close to each other, which is effective for avoiding enlargement of the construction axially of the spool shaft. Further, since the first and second pinion gears are not movable relative to the main gears, these pinion gears may have small diameters not very different from each other. This allows the rotating ratios of the pinion gears with respect to the main gears to be changed within an appropriate range by the shifter, and the spool to rotate at high speed.

In working the invention, the clutch element may comprise a tubular member axially slidably mounted on the spool shaft. The tubular clutch element is advantageous from the point of view of strength for transmitting high torque, and, mounted on the spool shaft, its sliding movement is stable. The sliding stability may be promoted by disposing the clutch element on a large-diameter portion defined on the spool shaft.

The clutch element may be held unrotatable through constant engagement with a gear element defining the pinion gears, the clutch element being axially movable into and out of engagement with the spool. Since the clutch element and the spool are readily engageable with each other, clutching operations may be carried out with ease. Compared with the case of engaging the clutch element with a small pinion gear, the engagement between the clutch element and the spool has the advantage of greater engaging strength. The clutch element need not be rotated at a declutching time, which promptly places the spool in a freely rotatable state.

The spool shaft may be supported by the reel body through a bearing defined peripherally of the clutch element mounted on the large-diameter portion. This allows the support for the clutch element and the support for the spool shaft with respect to the reel body to be provided at one position. This feature is effective for simplicity of construction around the clutch element, and contributes toward increased compactness of the entire reel.

Other objects, features and advantages of the present invention will be apparent from the following description of the preferred embodiment.

DESCRIPTION OF THE PREFERRED EMBODIMENT

An embodiment of the present invention will be described hereinafter with reference to the drawings.

Figure 1:
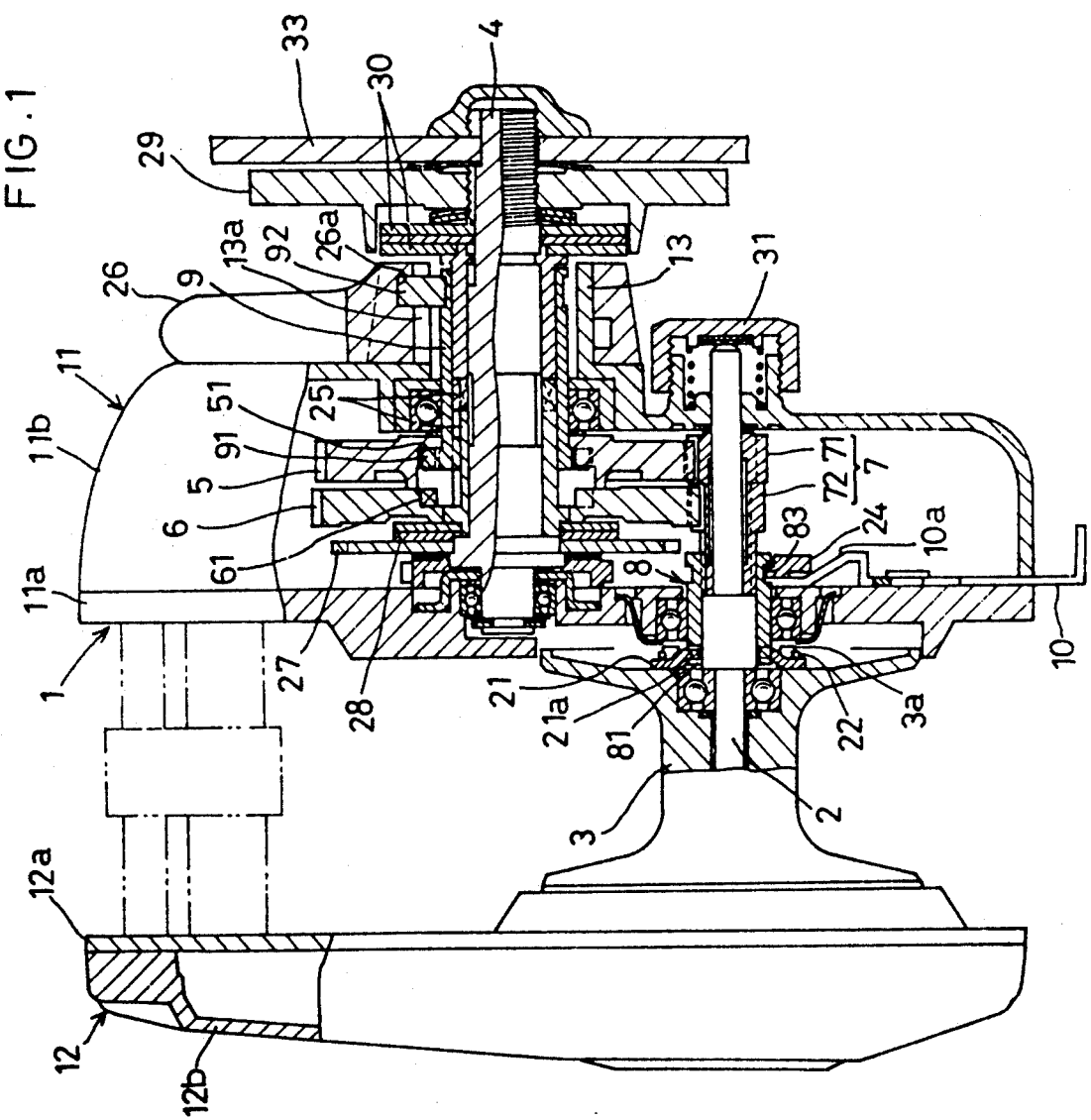
FIG. 1 is a partly sectional view of a reel according to the present invention.

Referring to FIG. 1, a reel comprises a reel body 1 including a first side frame 11 and a second side frame 12. The first side frame 11 includes a side plate 11a and a bowl-shaped cover 11b. The second side frame 12 includes a side plate 12a and a bowl-shaped cover 12b. A spool shaft 2 rotatably supports a spool 3 between the side frames 11 and 12. The first side frame 11 rotatably supports a handle shaft 4 extending parallel to the spool shaft 2. A first main gear 5 and a second main gear 6 having different diameters are rotatably mounted on the handle shaft 4. The spool shaft 2 supports a gear element 7 including a larger, first pinion gear 71 meshed with the smaller first main gear 5, and a smaller, second pinion gear 72 meshed with the larger second main gear 6. The spool shaft 2 further supports a clutch sleeve 8 slidably mounted thereon for making and breaking torque transmission from the gear element 7 to the spool 3. A shifter 9 is provided between the handle shaft 4 and main gears 5 and 6 for selectively transmitting rotation of the handle shaft 4 to one of the first and second main gears 5 and 6. The first side frame 1a slidably supports a clutch lever 10 for sliding the clutch sleeve 8.

Next, the structure of a reel of the above construction will be described in greater detail.

The spool 3 is rotatably supported on the spool shaft 2 through a pair of bearings 20. The spool 3 includes a retainer projection 3a attached to one end face thereof, the projection 3a defining a plurality of recesses and a flange at an end thereof. The retainer projection 3a supports a clutch plate 21 having peripheral projections for engaging the above-mentioned recesses. The clutch plate 21 is fixed in position by a retainer ring 22 to facilitate maintenance and change of the clutch plate 21.

The gear element 7 is rotatably supported adjacent one end of the spool shaft 2, and includes the pinion gears 71 and 72 defined on a cylindrical member. The gear element 7 is interposed, and held against axial movement, between a large-diameter portion 2a defined at an intermediate position of the spool shaft 2 and the bowl-shaped cover 11b. The gear element 7 further defines splines 73 peripherally of an end thereof adjacent the large-diameter portion 2a. The clutch sleeve 8 is rotatably supported by the side plate 11a through a bearing 23. The clutch sleeve 8 includes an engaging member 81 at one end thereof for engaging the engaging portion 21a, and teeth 82 formed at the other end and meshed with the splines 73. The clutch sleeve 8 further includes an annular groove 83 peripherally thereof adjacent the other end. The side plate 11a supports a clutch yoke 24 slidable axially of the spool shaft 2 and placed in engagement with the annular groove 83. The clutch yoke 24 is urged by a spring (not shown) in a direction to engage the engaging member 81 with the engaging portion 21a. The clutch lever 10 includes a cam 10a provided at an intermediate position thereof for contacting a side face of the clutch yoke 24. Thus, a forward operation of the clutch lever 10 causes the clutch yoke 24 to slide in the direction to separate the engaging member 81 from the engaging portion 21a. A return operation of the clutch lever 10 causes the clutch yoke 24 to slide in the opposite direction under the urging force of the spring.

The clutch lever 10 is in the form of a fork having the cam 10a. The clutch lever 10 is supported by the side plate 11a to be reciprocable relative to the side plate 11a through a guide pin, and swingable within a fixed range about the guide pin. A return spring is mounted between the clutch lever 10 and the side plate 11a. When the clutch lever 10 is operated forward, the tip end of the clutch lever 10 is engageable with a stopper provided on the side plate 11a, whereby the clutch lever 10 is maintained at an extreme forward position. With rotation of the handle shaft 4, a tooth of an anti-reversal gear 27 supported on the handle shaft 4 contacts the tip end of the clutch lever 10. As a result, the clutch lever 10 is swung about the guide pin and disengaged from the stopper, thereby returning under the force of the return spring.

The main gears 5 and 6 define a plurality of teeth around outer peripheries thereof, and engaging projections 51 and 61 around inner peripheries, respectively. The first main gear 5 includes an annular projection on a side face thereof which contacts an opposite side face of the second main gear 6.

The handle shaft 4 supports a transmission sleeve 25 mounted on an intermediate position thereof and including a large-diameter portion. The second main gear 6 is rotatably mounted on the large-diameter portion of the transmission sleeve 25. The shifter 9, which has a tubular shape, is relatively movably mounted on the transmission sleeve 25. The first main gear 5 is rotatably supported on the shifter 9. The transmission sleeve 25 comprises two tubular members which are in meshing engagement at an intermediate position of the transmission sleeve 25.

The shifter 9 includes engaging teeth 91 defined peripherally of an end thereof adjacent the spool for selectively engaging the engaging projections 51 or 61, and engaging teeth defined inside the same end thereof for engaging splines defined on the transmission sleeve 25, thereby stopping rotation of the latter. The shifter 9 further defines an annular groove at the other end thereof for retaining an engaging projection 92. The engaging projection 92 is in engagement with a helical groove 26a defined in a control element 26, whereby the shifter 9 is axially movable with a turning movement of the control element 26.

The control element 26 includes a boss defining a fitting bore for only rotatably fitting to a support tube 13 projecting outwardly from the bowl-shaped cover 11b, and a control portion projecting outwardly from one side of the boss. The above-mentioned helical groove 26a is defined in the fitting bore of the boss, while the support tube 13 defines a slit 13a for guiding the engaging projection 92. Thus, the shifter 9 is axially reciprocated with turning of the control element 26.

The handle shaft 4 supports the anti-reversal gear 27 mounted on one end thereof and engaged with anti-reversal claws supported by the side plate 11a. A braking disk 28 is disposed between the anti-reversal gear 27 and the second main gear 6. The handle shaft 4 carries a regulator 29 screwed to the other end thereof, and a plurality of braking disks 30 are disposed between the regulator 29 and the transmission sleeve 25. The regulator 29 is rotatable to apply a braking force to rotation of the transmission sleeve 25, and to rotation of the first main gear 5 or second main gear 6 rotatable with the transmission sleeve 25 and shifter 9. Rotation of the handle shaft 4 is transmitted to the first main gear 5 or second main gear 6 through the braking disks 28 and 30, transmission sleeve 25 and shifter 9.

The spool shaft 2 may be fixed, but is axially movable in the illustrated embodiment. A cast control regulator 31 is screwed to a position of the bowl-shaped cover 11b opposed to the end of the spool shaft 2. Further, a friction plate 32 is disposed between the bearing 20 and an end face of the spool 3. Thus, the regulator 31 is operable to apply a braking force to rotation of the spool 3 through the large-diameter portion 2a of the spool shaft 2 and the bearing 20.

Reference numeral 33 denotes a handle attached to an extreme end of the handle shaft 4.

The way in which the described reel operates will be described next.

Figure 2:
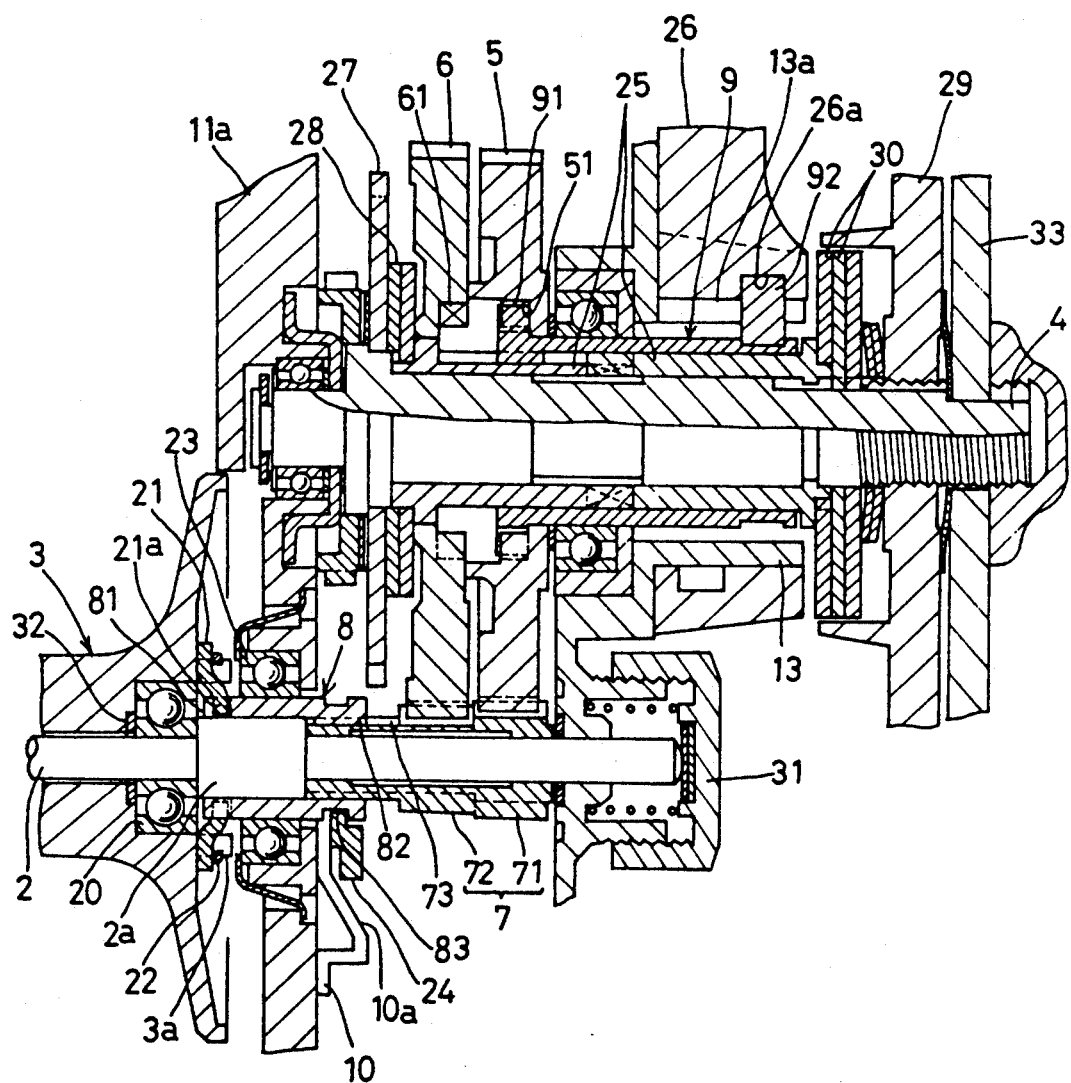
FIG. 2 is an enlarged sectional view of a principal portion of the reel.
Figure 3:
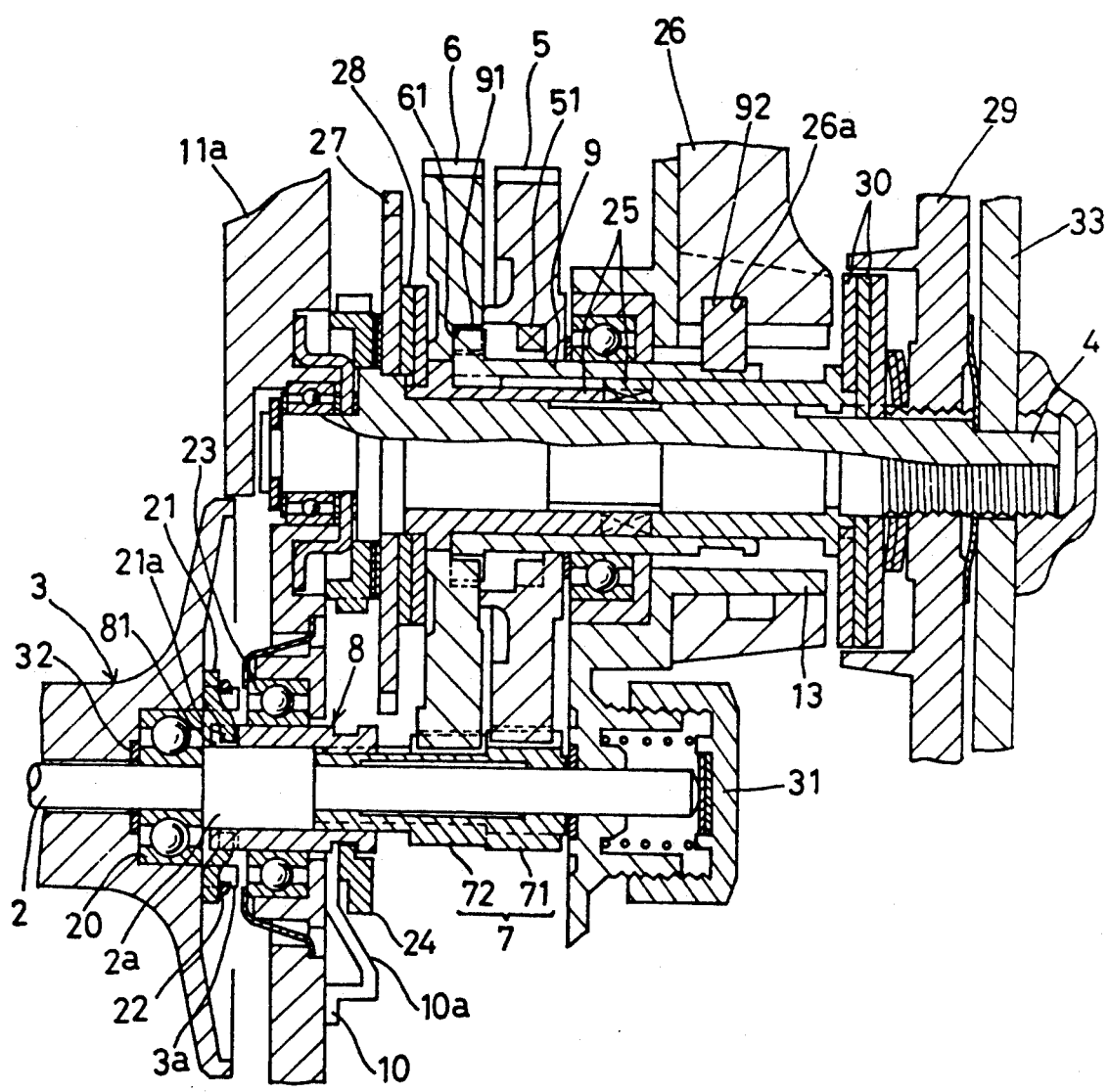
FIG. 3 is a view similar to FIG. 2 and showing an operative state.

FIGS. 1 and 2 show a state for driving the spool 3 at low speed. For changing this state to a high speed drive state, the control element 26 is turned in one direction. Then, the shifter 9 moves toward the second main gear 6, whereby the engaging teeth 91 of the shifter 9 engage the engaging projections 61 of the second main gear 6 as shown in FIG. 3. Consequently, drive of the handle shaft 4 can be transmitted to the spool 3 through the braking disks 28 and 30, transmission sleeve 25, shifter 9, second main gear 6, second pinion gear 72 and clutch sleeve 8, thereby driving the spool 3 at high speed. The control element 26 is turned in the opposite direction for changing from the high speed drive of spool 3 as shown in FIG. 3 to the low speed drive. Then, the shifter 9 moves toward the first main gear 5, whereby the engaging teeth 91 of the shifter 9 engage the engaging projections 51 of the second main gear 6, thereby driving the spool 3 at low speed.

For placing the spool 3 in a freely rotatable state, the clutch lever 10 is pushed. Then, the cam 10a of the lever 10 causes the clutch sleeve 8, through the clutch yoke 24, to slide toward the second pinion gear 72. The engaging member 81 of the clutch sleeve 8 disengages from the engaging portion 21a of the clutch plate 21, thereby braking torque transmission from the gear element 7 to the spool 3. Since the clutch sleeve 8 slides relative to the gear element 7 to render the spool 3 freely rotatable as described above, selection may be made freely as to the difference in diameter between the first pinion gear 71 and second pinion gear 72, i.e. the difference between the gear ratio between the first main gear 5 and first pinion gear 71 and the gear ratio between the second main gear 6 and second pinion gear 72.

The embodiment of this invention as described above may be modified as follows:

In the described embodiment, the spool 3 is rotatably mounted on the spool shaft 2, and rotation of the gear element 7 is transmitted directly to the spool 3 through the clutch sleeve 8. The spool shaft 2 may be rotatably supported by the reel body 1, with the spool 3 rotatable with the spool shaft 2. In this case, the spool shaft 2 defines a peripheral engaging portion for engaging the engaging member 81 of the clutch sleeve 8, whereby rotation of the gear element 7 is transmitted to the spool 3 through the clutch sleeve 8 and spool shaft 2.

Instead of the clutch sleeve 8 being disengageable from the spool 3 as in the illustrated embodiment, the clutch sleeve 8 may be engageable with and disengageable from the gear element 7. Although the clutch sleeve 8 acts as a clutch element in the illustrated embodiment, the clutch element is not limited to the sleeve member.

The shifter 9 has been described as axially movable with turning of the control element 26. Instead of this construction, the control member 26 may be movable radially of the handle shaft 4, with cam surfaces defined between opposite faces of the control element 26 and shifter 9. In this case, a spring is provided between the shifter 9 and a member fixed relative to the shifter 9 such as the transmission sleeve 25 or the side frame 11 for urging the shifter 9 toward the cam surfaces. In this way, the shifter 9 may be made axially movable with movement of the control member 26.

What is claimed is:

1. A fishing reel comprising:
   a reel body;
   a handle shaft rotatably supported by said reel body;
   first and second main gears rotatably mounted on said handle shaft;
   a shifter for selectively transmitting rotation of said handle shaft to one of said first and second main gears;
   a spool shaft for rotatably supporting a spool, said spool shaft being supported by said reel body;
   a gear element having first and second pinion gears, said gear element being mounted on said spool shaft, said gear element being rotatable relative to said spool shaft, and said gear element being axially unmovable relative to said spool shaft, said first and second pinion gears being constantly meshed with said first and second main gears, respectively;
   a clutch means for selectively transmitting and breaking the transmission of rotational force from said gear element to said spool;
   wherein said clutch means includes an engaging member which is peripherally rotatable relative to said spool shaft and which is axially movable relative to said spool shaft, said engaging member being axially movable relative to said gear element, and said engaging member being nonrotatable relative to said gear element such that said engaging member and said gear element rotate in unison, said clutch means further including an engaged member attached to said spool and engageable with said engaging member, and a clutch lever for axially moving said engaging member relative to said spool shaft;
   said spool shaft including a large-diameter portion formed between a support portion for supporting said spool and a gear-element engaging portion on which said gear element is engaged, said large-diameter portion having a diameter larger than a diameter of said gear-element engaging portion, said engaging member comprising a tubular member axially slidably fitted on said large-diameter portion; and
   an outer peripheral portion of said tubular member being supported by a bearing mounted on said reel body, said spool shaft being supported at said large-diameter portion by said bearing through said tubular member.

2. A fishing reel as claimed in claim 1, wherein said reel body restricts axial movement of said spool shaft, and wherein said gear element has opposite axial end faces, with one of said axial end faces being in abutment with an axial end face of said large-diameter portion, and with the other axial end face of said gear element being in abutment with said reel body, whereby said gear element is axially unmovable relative to said spool shaft.

* * * * *